United States Patent Office 3,512,992
Patented May 19, 1970

3,512,992
BAKING ADDITIVE AND METHOD FOR PRODUCING BAKED GOODS
Alfred Cooke and Harold Johannson, Montreal, Quebec, Canada, assignors to Delmar Chemicals Limited, Montreal, Quebec, Canada
No Drawing. Continuation-in-part of application Ser. No. 627,872, Apr. 3, 1967. This application Apr. 2, 1968, Ser. No. 718,237
Int. Cl. A21d 8/04
U.S. Cl. 99—91                                    15 Claims

ABSTRACT OF THE DISCLOSURE

Enzyme preparations having pentosanase activity are used in bread making processes. The baked bread exhibits improved original softness and improved resistance to staling. An enhanced whitening effect is obtained when the enzyme preparation additionally has catalase activity.

FIELD OF THE INVENTION

This application is a continuation-in-part of application Ser. No. 627,872, filed Apr. 3, 1967 now abandoned.

This invention relates to a baking composition and to a method for producing baked goods.

In its broadest aspect, the invention is directed to the preparation of bakery food, obtained from wheat flour as a major component. Thus, the invention includes the preparation of bread, cakes and doughnuts, especially including yeast-leavened doughnuts. However, it excludes breakfast cereals as well as alimentary pastes. The invention is particularly advantageous in the production of bread.

The invention will be described in detail in connection with the production of white bread from wheat flour. However, it is applicable in general to bread made from edible flour comprising proteins, starch and minerals. Typical of such flours are whole wheat, bolted white, rye, graham and the like.

DESCRIPTION OF THE PRIOR ART

Bread staling has been the object of various articles. The subject is reviewed in an article "Bread Staling—The Current State of Knowledge" by D. W. E. Axford, K. Coldwell and G. A. H. Elton, published September 1966 by the British Baking Industries Research Association.

Staling in bread is manifested by changes in hardness of bread crumb. Flavour changes are also associated therewith.

As disclosed in the aforesaid article, practical methods of slowing down or eliminating the deterioration of bread have been limited to the use of deepfreezing and of chemical additives such as emulsifiers.

Bread whitening is also a desirable quality in baking. To this effect, bleaching agents are used, often both in the production of flour and by the baker. Examples of such bleaching agents are benzoyl peroxide used by millers and enzymatically active soya flour by bakers.

SUMMARY OF THE INVENTION

It is an object of the present infention to provide a method for making bread and bread-like products having improved resistance to staling, i.e. improved resistance to a change in hardness of the bread.

It is also an object of the present invention to provide an anti-firming additive in baking compositions.

In accordance with the present invention, it has been found that incorporation of small amounts of a pentosan-degrading enzyme preparation to flour results in a surprisingly lasting softening effect on the baked bread.

Generally, any pentosanase or pentosan-degrading enzyme preparation can be used in the process of the present invention. Such an enzyme preparation should be in the class of food ingredients within the definition of the Food and Drug Administration, such as, for example, is derived from *Bacillus subtilis* or *Aspergillus niger*. The culture is incubated in a sterile liquid medium or in a porous sterile moistened bran-medium for several days at 20–45° C. as is well known in the art. The enzyme preparation is extracted from the culture with water and/or is precipitated therefrom by using a sulfate, e.g.

$(NH_4)_2SO_4$ or $Na_2CO_4$ and filtered. The recovered product is dried at mild temperatures, e.g., below about 65–70° C. preferably below 60° C. Reduced pressures can be used advantageously. Freeze drying methods can also be used. The dry product is ground to a fine powder. Commercial enzyme preparations do not include a single enzyme component but rather, a major and several minor components which may or may not have similar enzyme activity. It is not practical from a commercial point of view to fractionate commercial enzyme preparations. It is therefore expected that different commercial enzyme preparations having the same major enzyme component would differ somewhat in their activity and would have different or at least different amounts of minor components. However, all these considerations are known by persons skilled in the art. For practical purposes, it is preferred to use the enzyme preparation sold under the trademark "Rhozyme HP–150" by Rohm and Haas Company, a food grade enzyme product. However, the enzyme preparation sold under the trademark Cellulase 4000 by Miles Laboratories or that sold under the trademark Cellulase–AP3 by Amano Pharmaceutical Co. Ltd. can also be used. As will be known by persons skilled in the art, pentosanase preparations generally are components of commercial cellulase preparations.

The dry enzyme preparation is not active and can thus be stored. It is activated when in the presence of water and flour.

Although pentosanases are influenced and even destroyed by extreme conditions of temperature and pH, they are operative within the normal ranges of pH and temperature used in mixing bread ingredients and in bread fermentation.

The maximum amount of pentosanase preparation to be added is inversely proportional to the fermentation time allowed. Thus, an amount of enzyme preparation equivalent to 103 units of pentosanase activity (P.U.) per 400 grams of flour as determined by the method of Simpson (Can. J. Microbiology, 131–139, 1954) using purified wheat pentosan as the substrate reacting at pH 5.0 at 30° C. for 30 minutes is considered excessive in a sponge and dough formula if the fermentation is allowed to take place overnight. This same amount, however, is effective in a sponge and dough formula if fermentation time is reduced to 4½ hours. Similarly, if the fermentation time is reduced to 2 hours using the straight dough method, as much as 216 units of the above enzyme preparation can be used with good results. Use of 18 units in the same 2 hour fermentation recipe gives a detectible improvement, but it is not recommended to use less than this amount. In a continuous process, the preferred amounts are approximately those of the 2 hour straight dough formula.

The invention can be successfully applied to any of the several commercial procedures including the conventional batch procedure for preparing bread and the like. In this last case, the pentosanase preparation is advantageously introduced by incorporation into the flour.

However, it can also be added and mixed in with the water. In all cases, the enzyme preparation should be added at the beginning or as close to the beginning of the bread making process as possible for best results.

The invention can be used in connection with continuous processes for making bread. In a continuous process, the ingredients are first mixed in a mixing zone. The mixed products are then moved to a developing zone where the dough is subjected in a continuous manner to mechanical work so as to develop the gluten. After passing through the developing zone in continuous manner, the dough is forced through an orifice into a series of baking pans which are moved into a proofer, where the dough is allowed to rise. When it has risen sufficiently, it goes to the oven for baking.

For commercial applications, wherein multiples of 100 lb. of flour are used in formulas, the required amounts of enzyme preparation are as follows:

Overnight Sponge and Dough formula:
  operative amounts: 2000–8000 P.U./100 lb.
  preferred amounts: 2000–4000 P.U./100 lb.
4½ hour Sponge and Dough formula:
  operative amounts: 2000–12000 P.U./100 lb.
  preferred amounts: 4000–8000 P.U./100 lb.
2 hour Straight Dough formula:
  operative amounts: 2000–24000 P.U./100 lb.
  preferred amounts: 8000–16000 P.U./100 lb.
Continuous formula:
  operative amounts: 2000–24000 P.U./100 lb.
  preferred amounts: 8000–12000 P.U./100 lb.

A large excess of pentosan-degrading enzyme would be operative in the sense that it would increase the softness of the bread. However, such a large amount would also cause collapsing of the bread under normal handling.

The pentosanase preparation is preferably mixed with dried flour having preferably not more than 8% moisture in a proportion of 2.25 g. of pentosanase preparation having 1800 units of pentosanase activity per gram to dried flour to make up 4 ounces, care being taken to insure uniform blending. To this effect, it has been found expedient to add a free-flowing agent such as, e.g. tricalcium phosphate in proper amounts, e.g. 3% by weight of flour previous to mixing with pentosanase preparation. As will be apparent, the free-flowing agent must not alter the pH nor be active in the enzyme. The resultant pentosanase-flour concentrate is then used at the rate of from 2 ounces to as high as 20 ounces per 100 lbs. of flour in standard break making formulas depending on the fermentation time.

The pentosanase additive can obviously be added directly in equivalent controlled amounts to the flour to be used, or it can be added to an edible carrier such as, e.g. starch, flour, NaCl, $CaSO_4$ or sugar and the mixture then added to flour and the other ingredients. However, the above preferred procedure ascertains that thorough mixing is achieved.

The invention is especially advantageous in connection with the preparation of white bread so that compositions employing bleached and partially bleached bread wheat flours are particularly valuable ones.

It has also been found that the preferred enzyme preparation of the invention, Rhozyme HP–150, had the unexpected additional effect of causing a definite whitening action. In the trade, a whitening agent is normally used that is an enzymatically active soya flour containing Lipoxidase. The effect of the product of the invention cannot be attributed to a Lipoxidase. It is believed related to catalase activity, inasmuch as the system Rhozyme HP–150 exhibits catalase activity because it too decomposes $H_2O_2$.

In fact, while using the preferred enzyme preparation of the invention in the amounts stated in the following examples, a decided whitening effect is obtained over and above the anti-staling effect referred to hereinbefore.

Moreover, an enhanced whitening and anti-staling effect is obtained by using a single enzyme preparation showing the above activities.

However, in separately conducted tests, a whitening effect was obtained by using Fermcolase, a commercially available catalase, in an otherwise standard breadmaking recipe not containing a standard whitening agent. Amounts as little as 20 baker units (B.U.) per 100 weight flour as present in Rhozyme HP–150 or as much as 2000 B.U. or even 8000 B.U. as present in Fermcolase gave a definite pronounced whitening effect in the absence of a standard whitening agent. One baker unit is, by definition, the amount of catalase that would decompose 264 mg. of $H_2O_2$ under conditions of the assay: at pH 7.0, in the presence of 0.1 molar phosphate buffer, acting on a 1.5% $H_2O_2$ solution at 25° C. taken to completion.

It will thus be apparent that the product of the invention can be used with advantage to replace commercial anti-staling and whitening agents.

The preferred enzyme preparation of the invention, Rhozyme HP–150 also contains as minor constituents, amylase, protease, pectinase and anthocyanase. This last enzyme is known to break down yellow colored flavone-glycoside pigment components of flour. The flavone molecule is known from the literature to be very unstable.

Use of a large excess of Rhozyme HP–150, Cellulase 4000 or Cellulase–AP3 resulted in a definite browning effect, contrary to the results obtained by using reasonable commercial amounts from which the desired results were obtained.

DESCRIPTION OF THE PREFERRED EMBODIMENTS

The following examples will further illustrate the present invention. Parts are by weight unless otherwise indicated.

EXAMPLE 1

The following example illustrates the results of using different amounts of pentosanase in an otherwise standard bread making formula.

Five loaves were made using the sponge dough procedure, loaf 1 being the control loaf and loaves 2, 3, and 4 and 5 containing respectively .0025%, .005%, .01% and .015% by weight of Rhozyme HP–150 having 1800 units of pentosanase activity per gram, measured as described hereinbefore.

For each formula, 400 g. of baker's grade bread flour was used as can be seen from the following table of ingredients to which was added and thoroughly mixed 0 g., 1 g., 2 g., 4 g., and 6 g. respectively of a previously prepared mixture obtained by mixing together 990 g. flour and 10 g. pentosanase preparation having 1800 P.U. per gram.

The formula for the standard ingredients was as follows:

| Sponge | Ingredient | Dough |
|---|---|---|
| 267 | Flour | 133 |
| 174 | Water | 87 |
| 8 | Yeast | |
| | Sugar | 24 |
| | Salt | 8 |
| | Shortening | 24 |

For all loaves, the procedure was as follows: The sponge ingredients were mixed in a Hobart laboratory-scale mixer at a controlled temperature for about 2 minutes. The sponge was discharged into a trough and placed in a fermentation room maintained at about 80° F. and 75% relative humidity where it was allowed to remain overnight. The sponge was then returned to the mixer and the dough ingredients added and mixed in. After mixing, the dough thus obtained was divided, rounded, proofed, molded, panned and pan-proofed, in accordance with conventional practice. The loaves were then baked at 450° F. for approximately 25 minutes. The baked bread was allowed to cool, wrapped into a moisture proof container and stored overnight before judging and scoring.

The loaf having the lowest concentration of enzyme (loaf 2) was significantly softer than the control and with increasing concentration (loaves 3 and 4), the crumb became progressively softer. Loaf 5 was so soft that it could not withstand any significant pressure applied to it. Grain was not materially affected but the texture (feel of the crumb) was softer with increasing amounts of pentosanase preparation.

EXAMPLE 2

The following examples illustrate the results obtained by the method of the invention in a standard 4½ hour fermentation period in a standard bread-making formula containing a dough conditioner, amylase, protease, lipoxidase and fat.

Five loaves were made using the sponge dough procedure of Example 1. Loaf 1 was retained as control and loaves 2, 3, 4 and 5 contained respectively 0.0025, 0.005, 0.01 and 0.015% by weight of Rhozyme HP-150 having 1800 P.U. per gram. The pentosanase was added in the same manner as in Example 1.

The formula of the other ingredients was as follows:

| Sponge | Ingredient | Dough |
|---|---|---|
| 266 | Flour | 134 |
| 164 | Water | 114 |
| 2 | Arkady [1] | |
| 6.7 | Yeast | |
| 0.5 | Delpromase [2] | |
| 2.675 | Wytase [3] | |
| | Milk Powder | 8 |
| | Sugar | 20 |
| | Lard | 10 |
| | Salt | 9 |
| | Calcium Propionate | 0.5 |

[1] Arkady is a trademark (Standard Brands) for a dough conditioner containing —CaSO$_4$: water hardener; NH$_4$Cl: yeast nutrient; KBrO$_3$: oxidizing agent; NaCl: filler.
[2] Delpromase is a trademark (Delmar Chemicals) for a fungal amylase and protease.
[3] Wytase is a trademark (J. R. Short) for an enzymatically active soya flour.

The bread was baked in the manner shown in Example 1 except that fermentation period was 4½ hours instead of overnight.

The results were as follows, numerals being used to denote a certain property of the bread or dough as noted and a high numeral indicating a superior property:

| Loaf | Dryness of Dough [1] | Volume | Softness of Crumb [2] |
|---|---|---|---|
| 1 | 1 | 1 | 1 |
| 2 | 2 | 2 | 2 |
| 3 | 3 | 3 | 3 |
| 4 | 4 | 4 | 4 |
| 5 | 5 | 5 | 5 |

[1] Dryness of dough is measured after floor time.
[2] No detrimental effect was observed on the grain of the different loaves Two further loaves were made using the above standard formula but without whitening, one (loaf A) without Rhozyme HP-150, the other one (loaf B) containing 0.001% by weight of Rhozyme HP-150 having 1800 P.U./g. The two loaves thus obtained were compared for whiteness between each other as well as with loaf 1, the control in the above example.

The results were as shown in the following table.

Loaf:                                            Order of whiteness
A (no Wytase)[1] (no Rhozyme HP-150) _____ 3
1 (Wytase) _____ 2
B (Rhozyme HP-150) _____ 1

[1] Increasing whiteness with numerical descending order.

EXAMPLE 3

The following example illustrates the application of the method of the invention in a straight dough recipe.

While in the sponge-dough procedure, the yeast is allowed to work in a mixture of flour and water, before combining with the other ingredients, in the straight dough process, all the ingredients are mixed at one time. After discharge into a trough, the dough is allowed to ferment for 2-3 hours. After fermentation, the dough is treated in the same manner as in the sponge-dough procedure, i.e. dividing, rounding, proofing, molding, etc.

Using a straight dough procedure as described above and a fermentation time of 2 hours, eight loaves were made, loaf 1 being retained as control. Loaves 2-8 contained, respectively, 0.0025; 0.005; 0.01; 0.015; 0.02; 0.03 and 0.04% Rhozyme HP-150 having 1800 P.U. per gram added in the same manner as shown in Example 1. Thus, since 400 g. flour were used in each case as shown hereinafter, amounts of, respectively, 0; 1; 2; 4; 6; 8; 12 and 16 g. of flour-pentosanase mixture prepared as described in Example 1 were used.

The schedule of standard ingredients was as follows:

| | Grams |
|---|---|
| Flour | 400 |
| Water | 260 |
| Sugar | 12 |
| Salt | 8 |
| Yeast | 12 |
| Shortening | 12 |

The mixing was conducted for 30 seconds at low speed followed by 2 minutes at high speed in a Hobart mixer with a McDuffee bowl.

The dough was processed and baked as described above. The resulting loaves were all satisfactory. Loaves containing 0.005 and 0.015% pentosanase had the best grain and the best overall characteristics and loaves containing .0025; .005; 0.03 and 0.04% had the best colour and the best softness.

EXAMPLE 4

In this example the effect of the addition of a pentosanase preparation according to the invention was compared to the effect created by the addition of an emulsifier and to that created by addition of a bacterial amylase. The use of emulsifiers in bakery products is described in Canadian Pat. 628,458, issued Oct. 3, 1961. The use of a bacterial amylase is described in United States 2,615,810, issued Oct. 28, 1952.

Six loaves were prepared by the sponge and dough procedure, loaf 1 being retained as control. Loaf 2 contained an emulsifier. Loaf 3 contained a bacterial α-amylase. Loaf 4 contained the pentosanase preparation of the invention. The formula for the other ingredients was as shown in Example 1. The bread dough was allowed to ferment overnight. The baked loaves were tested with a Compressimeter 24 hours and 96 hours, respectively, after baking. The amounts of ingredients used and the results were as follows:

| Loaf | Additive | Amount | Compressimeter Units [1] | |
|---|---|---|---|---|
| | | | 24 hrs. | 96 hrs. |
| 1 | | | 10 | 20 |
| 2 | Atmul 500 [2] | 1% | 10 | 16 |
| 3 | Bacterial α-amylase | 2.75 S.K.B. [3] units/100 g. flour. | 9 | 17 |
| 4 | Pentosan-degrading enzyme. | 9 P.U./100 g. [4] flour. | 5 | 10 |

[1] Baker Compressimeter: Wallace & Tiernan, Inc.
[2] Atmul 500 is a trademark for a bread softener composed of mono- and di-glycerides of fat-forming fatty acids (Atlas Chemical Industries, Inc.).
[3] S.K.B. units and determined according to the method of Sandstedt, Kneen and Blish (Cereal Chemistry, vol. 16, p. 712, 1939).
[4] Units of pentosanase activity per gram as determined by the method of Simpson (Can. J. Microbiology, pp. 131-139, 1954) using purified wheat pentosan as the substrate reacting at pH 5.0 at 30° C. for 30 minutes.

EXAMPLE 5

In this example, the effect of the addition of a preparation in accordance with the invention was evaluated in a continuous process for making bread.

The ingredients used were as follows:

| Ingredient | Brew, percent by weight [1] | Other Ingredients, percent by weight [1] |
|---|---|---|
| Water | 68 | |
| Sugar | 8 | |
| Salt | 2.25 | |
| Milk solids | 3 | |
| Yeast food | 0.50 | |
| Calcium acid phosphate | 0.10 | |
| Calcium propionate | 0.10 | |
| Yeast | 2.30 | |
| Flour | | 100 |
| Shortening blend [2] | | 3 |
| Oxidation Solution | | ([3]) |

[1] Based on flour.
[2] Shortening blend—Lard, 2.64%; Cotton Seed Flakes, .14%; Emulsifier (Atmul 500), .22%.
[3] 12.5 p.p.m., Potassium iodate; 50 p.p.m., Potassium bromate.

The brew is allowed to ferment for 2½ hours at 86° F. All the ingredients including the brew are then added into a Hobart laboratory scale mixer at controlled speeds and mixed until effective blending has been achieved. The mixed dough is then transferred rapidly into the loading cylinder of a Wallace & Tiernan, Inc. pilot unit for continuous bread making wherein the dough is exposed to mechanical action and then extruded into pans. The dough is then provided to 1″ height above the pan and the loaves are baked at 425° F. for 18 minutes.

Six loaves were made using the above basic formula subject to the following considerations.

Loaves 1 and 2 were retained as controls, loaf 1 using the above formula with the Atmul 500 emulsifier, loaf 2 using the above formula without the Atmul 500 emulsifier. Loaves 3 and 4 were made from the above formula including emulsifier and adding to the brew 0.010% and 0.015% by weight respectively of Rhozyme HP-150 having 1800 units of pentosanase activity per gram, measured as described hereinbefore. Loaves 5 and 6 were identical to loaves 3 and 4 in their ingredients except that they did not contain the Atmul 500 emulsifier.

Compressimeter readings were taken with a Baker compressimeter (Wallace & Tiernan, Inc.) using AACC method 74–10 for staleness of bread. Each result is the average of 10 readings. These compressimeter tests were made after 24 hours and repeated on the same bread after 96 hours. The results were as follows:

| Loaf | Additive | Amount, percent | Compressimeter Units 24 hours | Compressimeter Units 96 hours |
|---|---|---|---|---|
| 1 | Atmul 500 | 0.22 | 4.4 | 11.8 |
| 2 | | | 5.6 | 9.7 |
| 3 | Rhozyme HP-150 / Atmul 500 | 0.10 / 0.22 | 1.4 | 4.9 |
| 4 | Rhozyme HP-150 / Atmul 500 | 0.015 / 0.22 | 2.2 | 5.2 |
| 5 | Rhozyme HP-150 | 0.010 | 2.1 | 4.7 |
| 6 | do | 0.015 | 2.0 | 4.9 |

The above results clearly show that the bread of the invention is softer initially, i.e. after a period of 24 hours than the bread baked in accordance with the conventional formula. These results also show that the bread of the invention firms more slowly with time, i.e. after 96 hours than the conventional bread containing an emulsifier.

The enzyme preparation of the invention can also be used as seen in the above test to replace emulsifiers as are generally used. It should be noted that the preparation of the invention is convenient and easy to handle.

We claim:

1. A method for producing bread and bread-like products comprising intimately combining with wheat flour and other dough-forming ingredients, a minor amount, sufficient to improve resistance to staling of a fine dry enzyme preparation having pentosanase activity, and water, working the resulting mixture to form a developed dough and baking or frying the dough so formed, said amount being relatively greater for a shorter processing time and smaller for a greater processing time.

2. A method according to claim 1 wherein said flour is at least partially bleached bread flour.

3. A method according to claim 2, wherein said dough is prepared by the sponge-dough procedure.

4. The method of claim 2 wherein the dough is prepared by a continuous dough procedure.

5. A method as claimed in claim 1, wherein said enzyme preparation also has catalase activity.

6. A method as claimed in claim 1, in which the enzyme preparation has an activity of at least 1800 pentosanase units per gm.

7. The method of claim 1 wherein said flour is partially bleached bread flour.

8. A method for producing bread and other leavened products which comprises intimately combining with flour and other dough-forming ingredients, water and an enzyme preparation having pentosanase activity, said enzyme preparation being present in an amount such that there is between 2,000 and 24,000 pentosanase units per 100 lbs. flour, working the resulting mixture to form a developed dough and baking or frying the dough so-formed.

9. A baking composition comprising an intimate mixture of wheat flour and a fine dry enzyme preparation having sufficient pentosanase activity to improve resistance to staling.

10. A product according to claim 9, having 2000–24000 units of pentosanase activity per 100 lbs. flour.

11. A product according to claim 9, having about 1000 units of pentosanase activity per ounce of composition.

12. A composition as claimed in claim 9, in which the enzyme preparation has an activity of at least 1800 pentosanase units per gm.

13. A composition as claimed in claim 9, in which the enzyme preparation has an activity of at least 1000 pentosanase units per ounce flour.

14. A composition as claimed in claim 9, which also includes a free-flowing agent.

15. A baking composition for bread and other leavened products which comprises an intimate mixture of flour and a fine, dry enzyme preparation having pentosanase activity, said enzyme preparation being present in an amount such that there are between 2,000 and 24,000 units of pentosanase activity per 100 lbs. flour.

References Cited

FOREIGN PATENTS 603,953    8/1960    Canada.

OTHER REFERENCES

Rohm and Haas Company Technical Bulletin on Rhozyme HP-150.

M. V. Tracey, "The Role of Wheat Flour Pentosans in Baking, I-Enzymatic Destruction of Pentosans in situ," J. Sci. Fd. Agric. vol. 15, pp. 607–611 (1964).

LIONEL M. SHAPIRO, Primary Examiner

J. R. HOFFMAN, Assistant Examiner